United States Patent Office 2,727,043
Patented Dec. 13, 1955

2,727,043

1,-AMINO-3,-IMINO, ISOINDOLENINES

Georg Rösch, Walther Wolf, and Heinrich Vollmann, Leverkusen, Germany, assignors to Farbenfabriken Bayer Aktiengesellschaft, Leverkusen, Germany, a corporation of Germany No Drawing. Application August 21, 1950,
Serial No. 180,696

Claims priority, application Great Britain August 25, 1949

4 Claims. (Cl. 260—319)

The present invention relates to new intermediate products and to processes for their production, in particular it relates to new phthalocyanine intermediates.

It is an object of the invention to provide new intermediate products which may be used for the production of phthalocyanines.

A further object of the invention is to provide new intermediate products which may be used for the production of phthalocyanines under gentle conditions, especially at lower temperatures.

A further object of the invention is to provide very reactive new intermediate products which may be utilized in the organic synthesis.

A still further object of the invention is to provide new methods for the production of said new intermediate products.

Another object of the invention is to provide processes for the production of said intermediates on a technical scale.

Additional objects and features of this invention will become apparent as the following description proceeds.

According to the prior art processes phthalocyanines have been produced by most various methods from most various starting materials. Important starting materials according to prior processes are, for instance, phthalic acid and phthalonitrile which are converted by the so-called "urea-process" or by the so-called "dinitrile-process" into phthalocyanines.

It is supposed that the formation of phthalocyanines in the hitherto used processes passes various intermediates. However, extensive experiments carried out for determining the reaction mechanism have failed to prove the presumed intermediates or to isolate them except mono-imino-phthalimide

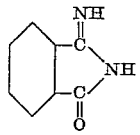

obtainable according to British Specification No. 520,415, for instance, by heating phthalimide with urea and ammonium molybdate.

According to theoretical considerations Haddock (Journal of the Society of Dyers and Colourists 61 (1945), page 71) thinks it possible that in the phthalocyanine synthesis an intermediate could be formed which contains 3 nitrogen atoms in one aromatic radical in a combined state and formulated this hypothetical intermediate as follows:

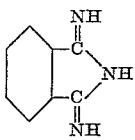

Haddock expressly declares, however, that this intermediate or any other intermediates of the phthalocyanine synthesis except the afore-mentioned mono-imino-phthalimide could neither be isolated nor determined.

It has now been found that such hitherto unknown intermediate products of the phthalocyanine synthesis are obtained by heating o-arylene dicarboxylic acids, their nuclear substitution products or functional derivatives thereof in the presence of substances giving off ammonia under the reaction conditions, for instance urea, as well as in the presence of preferably at least equimolar amounts of anions which are stable under the reaction temperatures, whereby preferably nitrate ions are used and in case functional derivatives of o-arylene dicarboxylic acids containing carbonyl groups or these acids are used as reactants, in the presence of catalysts promoting formation of phthalocyanine from o-arylene dicarboxylic acids and, if desired, in the presence of inert solvents, to temperatures of about 200° C.

The intermediate products obtained according to the present invention are believed to be derivatives of iso-indolenine.

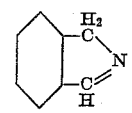

Their constitution is as follows:

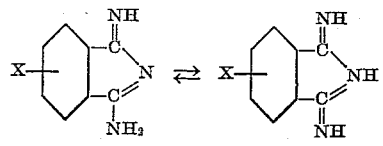

resp.

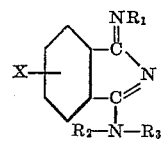

wherein X stands for hydrogen or for one or more organic or inorganic radicals. Generally, X stands for one or two substituents, however, some derivatives may carry three or four substituents. One or more of the carbon atoms in the carbocyclic nucleus may be replaced by hetero atoms. $R_1$, $R_2$ and $R_3$ may stand for hydrogen or also for organic or inorganic radicals.

As starting materials for the process according to the present invention o-arylene dicarboxylic acids capable of forming phthalocyanines as well as their substitution products and functional derivatives thereof may be used. Besides phthalic acid may be especially mentioned its nuclear substitution products, such as chloro phthalic acids, 4-methyl phthalic acid, 4-tertiary butyl phthalic acid, 4-phenyl phthalic acid, 3- or 4-methoxy- or ethoxy phthalic acid, 4-phenoxy phthalic acid as well as 4-sulfophthalic acid. Phthalic acid or said derivatives thereof may also be substituted by other radicals, such as $CH_3S-$, $C_2H_5S-$, $C_6H_5S-$, $ArO-$, $ArS-$. Further may be used polynuclear o-dicarboxylic acids, such as, for instance, naphthalene-2.3-dicarboxylic acid and anthracene-2.3-dicarboxylic acid and also o-dicarboxylic acids of hetero-cyclic ring systems, such as, for instance, pyridine-2.3-dicarboxylic acid and quinoline-2.3-dicarboxylic acid which may also be employed in form of their nitrates and pyro-mellitic acid. The o-dicarboxylic acids of hetero-cyclic ring systems containing five members may also be used in some cases as starting materials. For instance, thiophene-2.3-dicarboxylic acid may be mentioned as example. Of course, instead of the afore-mentioned dicarboxylic acids their functional derivatives may be used, such as, for instance, anhydrides, ammonium salts, imides, monoimino-imides, mono- and diamides including ureides, o-cyanocarboxylic acids, whereby the carboxylic acid group may be present in form of said functional derivatives, and o-dinitriles. It is to be understood that the o-dicarboxylic acids, their nuclear substitution products or the functional derivatives thereof which are known as starting materials in the production of phthalocyanines according to the prior art processes may also be used as starting materials for the production of the amino-imino-isoindolenines according to the present invention.

When using dicarboxylic acids or their functional derivatives containing carbonyl groups as starting materials it is necessary to add a catalyst for carrying out the reaction. The same catalysts may find application which may be used in the production of metal phthalocyanines by the conventional methods, for instance, from phthalic anhydride, according to the so-called urea process. Especially suitable catalysts are molybdic acid or its salts, for instance, ammonium molybdate. On starting from o-arylene dinitrile the addition of a catalyst may be dispensed with.

The term "substances giving off ammonia" means the compounds which may be employed on carrying out the phthalocyanine synthesis according to the urea process. Such products are, for instance, urea, guanyl urea or biuret which are used in excess.

For accomplishing the reaction according to the present invention it is further necessary to add such anions to the reaction mixture as are stable under the reaction conditions applied. These are in the first line anions of inorganic acids, such as, for instance, of nitric acid, phosphoric acid, sulfuric acid, hydrochloric acid, however, good results can also be attained by means of anions of organic acids, such as, for instance, or aliphatic and aromatic sulfonic acids as well as of methane sulfonic acid, methionic acid, toluene sulfonic acid, and of naphthalene-mono- and polysulfonic acids, for instance, naphthalene-1.5-disulfonic acid. These anions are to be used in at least equimolar quantities referred to the dicarboxylic acids or their functional derivatives. If minor quantities are employed the yield is generally reduced. Of course, larger quantities than the equimolar ones may also be used without the yield being impaired thereby.

When using o-arylene dicarboxylic acids or their functional derivatives containing carbonyl groups as reactants it is of advantage to use nitrate ions which yield with the corresponding 1-amino-3-imino-isoindolenines insoluble, salt-like compounds which are less affected by changes of temperature. However, on using o-dinitriles as starting material other anions yield equally good results. The said anions are advantageously charged in form of their ammonium salts or also as free acids which may be linked to the urea whereby it is of no consequence whether the anions are added to the reaction mixture already before or after the beginning of the reaction. In the production of the new intermediate products according to the present invention it is immaterial whether the components are simply melted or whether an inert solvent is added. In the first case, the substance giving off ammonia which is preferably used in excess acts as diluent. In the second case, as inert solvents higher boiling hydrocarbons or their substitution products, such as, for instance, solvent naphtha, nitrobenzene, di- or trichlorobenzene, chloronaphthalene, pyridine or quinoline may be used. The reaction is generally initiated at temperatures of or above about 140° C., i. e. temperatures whereat the starting material generally begins to melt. The reaction temperature may be raised to the temperature usually applied in the production of phthalocyanine according to the above described process whereby reaction is completed within a short period of time without phthalocyanines being formed thereby. Otherwise, the same conditions are applied which are customary in the production of phthalocyanines according to the above-said urea process.

Methods to be applied for isolation of the amino-imino-isoindolenines or their salts obtained according to this process differ somewhat depending upon whether the reaction has been performed with or without diluents. On working without diluents the melt is taken up with organic solvents, for instance, acetone, alcohols, water or in mixtures thereof, and is further diluted with water. The salts of the amino-imino-isoindolenines already precipitate if anions yielding difficultly soluble salts, such as nitrate- or aryl sulfonic acid anions were used for accomplishing the reaction. If, however, such anions were used as give easily soluble salts of the amino-imino-isoindolenines, the amino-imino-isoindolenines are preferably precipitated by addition of nitrate ions in form of their salts or by addition of concentrated aqueous salt solutions, such as ammonium chloride-, sodium chloride-, or ammonium phosphate solutions.

When the reaction has been accomplished in the presence of solvents isolation may be effected by simply separating the amino-imino-isoindolenines from the solvents wherein the amino-imino-isoindolenines in form of their salts are insoluble. They may further be purified by means of solvents.

The new intermediate products may also be obtained by adding ammonia or its derivatives to o-arylene dinitriles or the functional derivatives of o-dicarboxylic acids being free from carbonyl groups which may contain hetero atoms in the aromatic ring or to the nuclear substitution products thereof, if desired, in the presence of solvents and/or catalysts and/or under pressure.

Suitable starting materials for this reaction are derivatives of the above-said o-arylene dicarboxylic acid containing carbonyl groups including their nuclear substitution products capable of forming phthalocyanine which also comprise products with condensed rings and with hetero atoms in the arylene ring. As examples may be named phthalonitrile, 1.2.4.5-tetracyanobenzene, o-cyanobenzimino ether, alkyl-substituted phthalonitrile, for instance, 4 - methyl - phthalonitrile and 4 - tertiary - butyl-phthalonitrile, 3.4-dicyano-diphenyl as well as phthalonitrile substituted by alkoxy-, phenoxy-, sulfonic acid groups and halogen. As polynuclear dinitriles may be mentioned naphthalene-2.3-dinitrile and as heterocyclic dinitrile dicyano-pyridine-2.3. Also diphenyl maleic acid dinitrile which in this case is to be regarded as an aromatic system, may be used as starting material for this reaction. Furthermore, o-dinitriles may find application which are substituted in the nucleus by one or more $CH_3S-$, $C_2H_5S-$, $C_6H_5S-$, $ArO-$, $ArS-$. It is to be understood that all dinitriles or functional derivatives of o-dicarboxylic acids being free from carbonyl groups which are known as starting materials in the production of phthalocyanines may also be used for producing the new intermediates according to the present invention.

According to this process, besides ammonia, also derivatives thereof, for instance, primary and secondary amines, such as methylamine, ethylamine, cyclohexylamine, aniline, ethanolamine, pyridine and dimethylamine may be added to the said derivatives of o-arylene dicarboxylic acid being free from carbonyl groups. Generally, the derivatives of ammonia are suited which are stable under the reaction conditions. The addition of ammonia or of said derivatives thereof to the aforementioned functional derivatives of o-arylene dicarboxylic acids being free from carbonyl groups, i. e. principally to the o-dinitriles, can be effected in various manners. Thus, for instance, the said reactants may be treated with ammonia or its derivatives without any additions and in the absence of solvents at temperatures above 100° C., preferably in the autoclave. After completion of the reaction the excess of ammonia or derivatives thereof respectively is removed. The reaction product thus obtained is amino-imino-isoindolenine in technically pure form which may directly be used or previously further purified by treating with water or organic solvents. In order to facilitate purification it may be of advantage to carry out the reaction in the presence of organic solvents, for instance, of a low alcohol. On using a higher boiling solvent, for instance, polyvalent alcohols, it is not necessary to carry out the reaction in the autoclave but it is sufficient to dissolve the starting materials in the autoclave and to pass ammonia or derivatives thereof in the gaseous state over or through the solution heated to at least 100° C. If the ammonia derivative to be added has a sufficiently high boiling point, for instance, monoethanolamine, it is sufficient to dissolve the starting material in this ammonia derivative and to heat, for instance, to temperatures between 70° and 140° C. In this way, the reaction proceeds practically quantitatively without further additions being required.

The reaction may also be performed in the presence of anions which are stable under the reaction temperatures applied. The anions may be charged, for instance, in form of their ammonium salts, such as ammonium nitrate, ammonium chloride and ammonium phosphate. When processing in this manner the corresponding salt of the 1-amino-3-imino-isoindolenine is produced which may be purified as described in the foregoing.

If a catalyst is added, the reaction may also be accomplished at lower temperatures. Suitable catalysts are heavy metal compounds, especially those which may be used for the production of phthalocyanines. As examples may be mentioned copper salts, especially salts of bivalent copper and salts of cobalt, nickel, iron, cadmium or also activated metals, for instance, Raney-nickel. Also in this case, it is of advantage to carry out the reaction in the presence of a solvent and, especially, in the presence of mono- or polyvalent alcohols. The said catalysts are added to the solution of the starting material in quantities of about 0.1–50% calculated on the starting material used and the solution is saturated with ammonia or its gaseous derivatives mentioned above or a stream thereof is passed over the solution. When using liquid or solid derivatives of ammonia these may be introduced into the solution. In this case, the addition of special solvents may be dispensed with as, for instance, in the case of monoethanolamine. The reaction mostly proceeds already at room temperature. The reaction results in the formation of the free base which mostly crystallizes from the solvent and may be separated in known manner. However, the base may also be isolated in form of its salts, for instance, by addition of nitrate ions, or in form of its carbonate by introducing carbon dioxide.

Besides the said heavy metal compounds also metal alcoholates or substances or mixtures acting as alcoholates or also alkali metal amides promote the addition of ammonia or the said derivatives thereof to the said functional derivatives of the o-arylene dicarboxylic acids being free from carbonyl groups. However, on using these products care has to be taken that the reaction temperatures are kept so low as to prevent the formation of phthalocyanine at all or, at least, to a material extent. Suitable metal alcoholates are those of alkali metals, alkaline-earth metals and aluminum whereby the alcohol component may consist of monovalent alcohols of any chain length desired or also of polyvalent alcohols, such as glycols, glycerol. It is not absolutely necessary to charge ready-made metal alcoholates but processing may also be performed under conditions effecting the formation of alcoholates during reaction, for instance, when using alcohols together with the said metals or when using alkali metal amides together with an alcohol. However, the same effect is also attained by charging the said metal amides together with liquid ammonia or acid amides, such as formamide, acetamide. The amount of alcoholates or amides respectively required for accomplishing the reaction may vary in a wide range. Thus, for instance, it is possible to obtain good yields with 1% or less of alcoholate calculated on the functional derivative of the o-arylene dicarboxylic acid being free from carbonyl groups. Similar yields are attained on using quantities corresponding to 1 mol of alcoholate per 1 mol of the afore-mentioned derivative or quantities exceeding said proportion.

Suitable solvents are in the first line the lower mono- or polyvalent alcohols, such as, for instance, methyl-, ethyl-, propyl-, butyl-, or amyl-alcohol or glycol or, as already mentioned above, acid amides or liquid ammonia. The said solvents may also be used together with indifferent solvents miscible therewith. As examples may be mentioned benzene, toluene, tetrahydrofuran or diethyl glycol.

On using the last-mentioned catalysts the optimum reaction temperatures vary in a wide range and depend on the character of the metal-alcoholate or -amide and of the solvents or solvent mixtures used. On processing with liquid ammonia the boiling temperature of ammonia is generally sufficient to accomplish the reaction whereas in other cases the optimum reaction temperature is at about 40° C. However, it may be sometimes of advantage to process at temperatures up to or above 100° C. Care has to be taken that the upper limit of the reaction temperature is not exceeded since in this case the formation of phthalocyanine takes place. In spite of this fact, it is possible in some cases to operate within this critical temperature range if the reaction is performed within a very short time so that only 1-amino-3-imino-isoindolenines are principally formed, i. e. if reaction is stopped before formation of phthalocyanine starts or directly after starting of the dyestuff formation.

On using the said catalysts it is also possible to charge, besides the said arylene o-dinitriles, the corresponding hydrogenated dinitriles, for instance, Δ-4,5-4-methyl-tetrahydro-phthalonitrile. The corresponding hydrogenated 1-amino-3-imino-isoindolenines are thus obtained. The same conditions of reaction etc. are followed as those described above.

When using the last-mentioned catalysts the process may be carried out by reacting o-arylene dinitriles with the alcoholates in the absence of ammonia or amines to form the corresponding 1-alkoxy derivatives of the 3-imino-isoindolenine which are described in the copending application Ser. No. 180,695, now Patent No. 2,683,643 of even date relating to "Process of Dyeing and Printing" and reacting the 1-alkoxy-3-imino-isoindolenines thus obtained which may be monomeric as well as condensed ones depending on the reaction conditions applied, after isolation or also in the reaction mixture with ammonia or said derivatives of ammonia. If ammonia or its gaseous derivatives are used for this reaction, the same are preferably passed through the solution of the alkoxy compounds in an organic solvent, such as, for instance, benzene, acetone or in alcohol, or the ammonia or the derivatives thereof are dissolved in alcohol and added to the solution of the alkoxy compounds. However, salts of ammonia or derivatives thereof may also be used which are reacted with the alkoxy compounds in form of their solutions. For accelerating the reaction it may be sometimes of advantage to process in the presence of some water in the reaction solution.

If monomeric alkoxy compounds are used for carrying out the reaction the monomeric amino-imino-isoindolenines are obtained. If, however, condensed alkoxy-imino-isoindolenines are employed as reactants, condensed amino-imino-isoindolenines may be obtained, if the reaction is accomplished within a short time. Condensed amino-imino-isoindolenines comprise compounds wherein one carbon atom each belonging to the heterocyclic nucleus of two molecules of the isoindolenine are connected by a nitrogen bridge and which may contain alcohol as an addition. As example of such compounds a dimeric product may be mentioned.

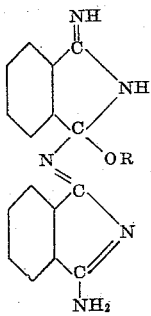

Chains have been observed consisting of one to four and sometimes up to 6 molecules of the monomeric compound whereby in the case of the polymeric chains ring formation may occur. In the latter case the intermolecular polycondensate contains no free amino- or imino groups. If the ammonia or the amines are reacted for a longer time the nitrogen bridge is split off and a further molecule of ammonia is added so that, for instance, in the case of the dimeric product 2 molecules of monomeric amino-imino-isoindolenine are formed.

When using primary amines as derivative for carrying out the above reaction, also the imino group of alkoxy-imino-isoindolenine may be replaced by these primary amines.

Isolation of the amino-imino-isoindolenines thus obtained from the reaction solutions as far as they are crystallized may be accomplished in known manner by simply separating out. The non-crystallized portions may be isolated either after concentrating the solution, preferably in vacuo, or by adding the aforesaid anions forming difficultly soluble salts.

Besides the said alkoxy-imino-isoindolenines also the corresponding thio-compounds may be used for carrying out the reaction with ammonia. Thus, for instance, according to Porter, Robinson and Wyler (Journal of the Chemical Society, London 1941, page 620) a mercapto compound is obtained which is indicated as o-cyano-thiobenzamide by addition of sodium sulfhydrate to phthalonitrile. The same compounds may also be produced by reaction of anhydrous sodium sulfide upon phthalonitrile in methanol. The products prepared according to these two processes are believed to be 1-mercapto-3-imino-isoindolenines. For obtaining the corresponding amino-imino-isoindolenines the said mercapto compounds are preferably reacted with ammonium nitrate in the presence of a solvent or suspending agent and the nitrates of the amino-imino-isoindolenine thus formed are isolated by separating in simple manner.

Instead of using the said alkoxy-imino-isoindolenines it is also possible to charge alcohol-hydrochloric-addition-products obtained from aromatic o-dinitriles according to Pinner ("Die Imidoäther und ihre Derivate," Berlin 1892, page 2 etc.) which are almost identical with the above-mentioned alkoxy-imino-isoindolenines except that they contain hydrogen chloride in the molecule. Hence it follows that in the reaction of the products obtained according to Pinner with ammonia or its derivatives which is preferably carried out in alcohol, care has to be taken that processing is done at very low temperatures, for instance, at 0° C. in order to avoid saponification by the hydrochloric acid present.

In the production of the N-substituted derivatives of amino-imino-isoindolenines it is not absolutely necessary to start from dinitriles or the above-mentioned reactants, but these starting materials may also be reacted with ammonia to form amino-imino-isoindolenine which is not substituted at the nitrogen and the products thus obtained or their salts respectively may be reacted subsequently with the above mentioned derivatives of ammonia, such as primary and secondary amines, hydroxyl- amine and alkanolamines. This exchange reaction generally proceeds smoothly with splitting off ammonia. The reaction is most easily performed with primary amines whereby the reaction velocity is often satisfactory at room temperature. It is often of advantage to carry out the reaction in a solvent. Suitable solvents are in the first line alcohols, especially methanol or also water or formamide. When the reaction is accomplished by means of liquid amines, such as, for instance, ethanol amine, anisidine, an excess of these products may act as solvent. In the case of primary amines either the amino group alone or also the amino group and the imino group may be substituted. The weakly basic aromatic amines, for instance, aniline substitute the amino group only when the reaction is performed under gentle conditions. The imino group is substituted at higher temperatures and when the reaction is performed within a longer period of time.

On using strong basic, primary, aliphatic amines the exchange of the imino group is so easily effected that generally derivatives substituted at both nitrogen atoms can be isolated. On using secondary amines derivatives are obtained which are substituted at one nitrogen only. It is often possible to exchange the substituted amino or imino group vice versa by treatment with ammonia in excess against a non-substituted amino- or imino group.

Isolation of the 1-amino-3-imino-isoindolenines thus obtained may be accomplished in usual manner, for instance, by simply separating the portions crystallizing out of the reaction solution. In other cases they may be precipitated and separated by adding solvents reducing their solubility and being miscible with the originally used solvent, for instance, hydrocarbons or ice water. However, anions may be added which yield difficultly soluble salts, for instance, nitrate ions. Finally, the 1-amino-3-imino-isoindolenines may also be obtained by distilling off the solvent used in the reaction.

The new intermediate products are also obtainable by producing the yellow to red colored complex compounds containing copper from o-arylene dicarboxylic acids, which may also contain hetero atoms in the aromatic nucleus, or their nuclear substitution products capable of forming phthalocyanine or their functional derivatives, which comprises heating said o-arylene compounds with copper salts and substances giving off ammonia. Thereupon the complex compounds thus obtained which contain more than one atom of copper per one o-arylene radical are treated with agents capable of dissolving monovalent copper directly or after converting same into the bivalent state. The treatment of the said complex compounds is preferably effected with nitric acid whereby advantageously during this treatment or subsequently anions are added which yield difficultly soluble salts with the amino-imino-isoindolenines obtained according to the present invention.

Complex compounds containing more than one atom of copper per one o-arylene radical obtained from o-arylene dinitriles and copper salts in the presence of substances giving off ammonia at elevated temperatures have already been known. Their production is accomplished in most various ways whereby compounds are obtained which depending upon the reaction conditions applied differ in their outer appearance, especially in color as well as in their physical and chemical properties, for instance, solubility and reactivity. They may be more or less easily soluble or also insoluble in high boiling solvents, for instance, quinoline. However, all these compounds are characterized in that they contain more than one atom of copper per one o-arylene radical and that they yield the above-described new intermediate products of the phthalocyanine synthesis by treatment with agents dissolving monovalent copper directly or after converting same into the bivalent state.

The preparation of these copper complexes has been described, for instance, in FIAT Final Report 1313, vol.

III, pages 342, 344, 345. According to this citation they are obtained as difficultly soluble to insoluble substances from phthalonitrile and cuprous chloride or cuprous bromide whereby more than one mol of the cuprous salt calculated on one mol of phthalonitrile is used. The mixture of phthalonitrile and the said cuprous salts is heated in the presence of urea and formamide at temperatures up to about 180° C. They may be obtained quite generally from o-arylene dinitriles and copper salts in the presence of urea or formamide at about the same temperatures. The reaction may be carried out in the presence of indifferent solvents, for instance, nitrobenzene or chlorobenzene. However, on using high boiling solvents, for instance, quinoline, it is not necessary to add substances giving off ammonia, for instance, urea or formamide but ammonia may be added in its gaseous form. Suitable reactants for the production of the insoluble copper complex compounds are besides o-dinitriles, the corresponding o-dicarboxylic acids, their nuclear substitution products or also the functional derivatives thereof described heretofore. In case the starting materials contain carbonyl groups, the above described catalysts used in the production of phthalocyanine according to the said "urea process," for instance, ammonium molybdate and molybdic acid have to be added. The optimum reaction temperatures may be varied between 140 and about 220° C. Instead of using the above-said cuprous chloride or cuprous bromide also other copper salts may find application, for instance, copper nitrate or copper acetate. In all cases the difficultly soluble to insoluble copper complexes are obtained provided that more than 1 mol of the copper salt per one mol of the o-arylene dicarboxylic acid or the functional derivatives thereof is used. Hence it follows that copper salts not dissolving in the reaction medium under the reaction conditions applied or only to an immaterial extent shall not be used if possible since otherwise the quantity of dissolved copper salts in the reaction mixture may be too small and the corresponding phthalocyanines may be formed. In this connection a process for the production of copper complexes may be mentioned according to which the complex compounds may be obtained at room temperature or only slightly raised temperature. This process is carried out, for instance, by dissolving arylene dinitriles in a lower alcohol, for instance, methanol and introducing gaseous ammonia after adding an excess of cuprous chloride (more than one mol of cuprous chloride per one mol of o-dinitrile). When using other solvents than alcohol which at least slightly dissolve the copper compounds in combination with the ammonia introduced, such as, for instance, ketones or tertiary amines, it is often necessary to process at higher temperatures. In this case it may also be necessary to apply the ammonia under pressure. Ammonia may also be replaced by its salts. As copper salts may be used, besides the salts of monovalent copper, the salts of bivalent copper or the hydroxide of bivalent copper. The complex copper compounds obtained by means of bivalent copper compounds are mostly blue-grey colored.

Decomposition of the complex copper compounds is effected as already mentioned with agents capable of dissolving the complex-combined copper whereby the complex is destroyed. On the other hand, these agents shall not saponify the 1-amino-3-imino-isoindolenines formed. For this purpose, mineral acids and alkali cyanides have proved to be most suitable. On using mineral acids processing is preferably carried out with anhydrous acids in order to avoid saponification of the new intermediate products, and at very low temperatures, i. e. preferably while cooling with ice, or the mineral acid is added in quantities only so that towards the end of the reaction the mixture shows no longer a mineral acid activity. Saponification of 1-amino-3-imino-isoindolenines is especially prevented or reduced by the presence of anions yielding insoluble salts with the isoindolenines. Anions suitable for this purpose are, for instance, those of nitric acid and of aryl sulfonic acids. Herefrom the particular advantages of the application of concentrated nitric acid for decomposition are given. By observing the above-mentioned conditions good yields are also obtained by means of concentrated sulfuric acid containing some sulfur trioxide, or with mixtures of strong mineral acids with anhydrous organic acids. When the acid shows no oxidizing effect it has proved to be of advantage for achieving a smooth and fast reaction to add oxidizing agents, such as hydrogen superoxide, or organic or inorganic peracids. When using acids which do not yield insoluble salts with the amino-imino-isoindolenines it is advisable for the above-said reasons to add the anions forming difficultly soluble salts, for instance, salts of toluene sulfonic acid, naphthalene sulfonic acid or naphthalene disulfonic acid or also nitrate ions already during decomposition. However, if decomposition is effected by means of alkali cyanides, it is not necessary to add the aforesaid anions since the 1-amino-3-imino-isoindolenines formed in the alkaline reacting alkali cyanide solution are present in form of free bases which are difficultly soluble therein and immediately crystallize. Thereby they are substantially prevented from being saponified by the alkaline solution. Suitable cyanides are in the first line potassium and sodium cyanide which are preferably used in form of their aqueous solutions. Cyanides have to be added at least in such quantities so as to be capable of forming the corresponding complex alkali copper cyanide compounds with the dissolved copper ions.

Isolation of the difficultly soluble salts of 1-amino-3-imino-isoindolenines thus obtained may be accomplished by simply separating out. A preferred method of execution consists, for instance, in pouring after decomposition of the copper complex compounds the mineral acid solutions onto ice or in diluting these solutions with water with good stirring, the difficultly soluble salts of 1-amino-3-imino-isoindolenines immediately precipitating thereby. If the above-said anions are not added during decomposition 1-amino-3-imino-isoindolenines may be precipitated by subsequent addition of these anions, if necessary, after neutralization of the mineral acids from the aqueous solutions. Precipitation may be accomplished, for instance, by adding to the ice-water into which the concentrated acid is introduced, at least the equivalent amounts of alkalies, such as ammonia, alkali lye, alkali carbonate or bicarbonate, for neutralizing the acid. If decomposition is effected with alkali cyanides the 1-amino-3-imino-isoindolenines crystallizing may be easily separated in known manner after complete decomposition of the complexes.

The amino-imino-isoindolenines obtained according to the above described processes represent new products. They are generally colorless to yellow colored and mostly readily crystallize. They are stable and fast to storing in their crystalline form. Their melting points are generally above 100° C. On melting, in most cases, splitting off of ammonia or the derivatives thereof and decomposition take place, colored melts being left thereby.

The amino-imino-isoindolenines partly dissolve in water and in alcohols to form the corresponding hydrates or dihydro-alkoxy derivatives, i. e. they absorb one mol of water or alcohol. Furthermore, they are soluble in dilute and in concentrated acid from which they may be recovered in form of their salts only. These salts are more or less soluble in water, such as, for instance, the formates, acetates and chlorides; difficultly soluble are, for instance, the nitrates, sulfites, phosphates, oxalates and the aryl sulfonic acid salts. The salts of amino-imino-isoindolenines wherein nitrogen is substituted often behave differently as to their solubility from the unsubstituted ones. The salts when heated are also soluble in a number of organic solvents, such as in substituted aromatic hydrocarbons, such as nitrobenzene, chlorobenzene and acid amides, for instance, tertiary bases, for instance, pyridine. Also in this case, decomposition, i. e. splitting off of ammonia or derivatives thereof mostly takes place. The salts are generally difficultly soluble in aliphatic and aromatic hydrocarbons as well as in ketones, ethers etc. With dilute alkali lyes the hydrates or the free base respectively form alkali metal salts being easily soluble in water.

The 1-amino-3-imino-isoindolenines are gradually saponified in aqueous solutions, the corresponding mono-imino-arylene-dicarboxylic-acid-amides being formed thereby. Decomposition is promoted by heating or adding dilute acids or alkali lyes.

The salts of 1-amino-3-imino-isoindolenines generally contain one acid residue per one mol of isoindolenine—however, salts have been isolated containing less, for instance, ½ or ⅓ equivalent of the acid per 1 mol of isoindolenine—which is mostly present in a combined state, for instance, in the case of nitrate. The salts may also be recrystallized from aqueous ammonia solutions under certain conditions. On the other hand, in any case, the free base or its nitrate respectively is obtained by adding equivalent amounts of alkali lye to the salts.

The 1-amino-3-imino-isoindolenines, as far as their amino group is not substituted, are accessible to many reactions of the primary amines. For instance, they may be acylated or alkylated. With diazonium compounds they yield diazo-amino compounds. They can easily be reacted with aldehydes. Aromatic o-dinitriles may be added in the presence of alkali metal alcoholates to form higher molecular products mostly containing alkoxy groups in the molecule. The 1-amino-3-imino-isoindolenines are converted with phenyl hydrazine into intensely colored compounds. On heating the 1-amino-3-imino-isoindolenines in high boiling solvents for a longer time ammonia or, if N-substituted compounds have been used, the derivatives thereof are split off and condensation products are obtained which contain i. a. tricyano cyaphenine. On heating the 1-amino-3-imino-isoindolenines in pyridine-water-mixtures in the presence of sodium hydrosulfite generally blue colored solutions are obtained which by the action of excess sodium hydrosulfite or atmospheric oxygen easily decolorize again.

On heating solutions of amino-imino-isoindolenines with reducing agents, for instance, with formaldehyde or if reducing agents are used as a solvent, for instance, formamide, more or less large quantities of metal-free phthalocyanines are obtained. On heating them together with metal salts and reducing agents the corresponding metal phthalocyanines are formed.

The monomeric as well as the condensed aromatic 1-amino-3-imino-isoindolenines may be reacted with heavy metals forming complexes, if necessary, in the presence of solvents to form crystallizable complexes.

The 1-amino-3-imino-isoindolenines according to the present invention may be substituted as already mentioned above in the carbocyclic ring by one or more radicals or atoms which may stand in the most various free positions. Depending on which starting materials has been used various substituents may simultaneously be present. Compounds containing only one or also two substituents have been observed regardless which substituents are present. However, in some cases the compounds contain also three or four substituents. As substituents may be mentioned: methyl, ethyl, propyl, butyl, cyclohexyl, substituted cyclohexyl, phenyl, naphthyl, pyridine, bromine, chlorine, sulfonic acid, carbonyl, methoxy, ethoxy, butoxy, cyclohexoxy, phenoxy, $CH_3S-$, $C_2H_5-$, $C_6H_5S-$, $ArSO_2-$, Ar standing for an aromatic radical, and the corresponding substituted derivatives of these radicals. The compounds may also carry anellated aromatic or heterocyclic nuclei.

Besides the above-said nuclear substituents the compounds may carry at the nitrogen of the imino and amino group the most various organic substituents, such as for instance, the radical of acetic acid, formic acid and other organic acids, alkyl groups, such as methyl, ethyl, propyl, butyl, pentyl etc., cyclohexyl, aryl groups, such as phenyl, substituted phenyl groups, naphthyl, anthraquinonyl, and $NH_2CO-$, as well as substituted derivatives thereof, such as, for instance, $HOCH_2CH_2-$, $CH_3COOCH_2CH_2-$, $o-C_6H_{11}OC_3H_6-$, $o-CH_3OC_6H_4-$, $m-CH_3OC_6H_4-$, $p-CH_3OC_6H_4-$, $o-ClC_6H_4-$, $m-ClC_6H_4-$, $p-ClC_6H_4-$, $p-O_2NC_6H_4-$, $p-C_2H_5OOC.C_6H_4-$, $p-H_2NSO_2C_6H_4-$, $m-H_2N.C_6H_4-$, $p-H_2N.C_6H_4-$, $p-HO.C_6H_4$. It may further be pointed out that the derivatives substituted in the imino group only and carrying a non-substituted amino group can be generally not prepared.

The new 1-amino-3-imino-isoindolenines—as far as they contain in the amino group an active hydrogen atom in a combined state—may be present in their tautomeric forms, i. e. a hydrogen atom is attached to the nitrogen bridge; in this case the 1-amino-3-imino-isoindolenines show the constitution of the corresponding diimino-imides. In some cases, however, other tautomeric forms may also be present.

The invention is further illustrated by the following examples without being restricted thereto, the parts being by weight.

*Example 1*

148 parts of phthalic anhydride are heated while stirring at 150–160° C. for 20 hours with 300 parts of urea, 160 parts of ammonium nitrate and 0.3 part of ammonium molybdate.

The initially uniform melt becomes more and more granular. The reaction product which becomes crumbly towards the end of the reaction can easily be taken out of the reaction vessel before it grows completely cold. After cooling the hard reaction product is crushed, ground with water, sucked off and the residual amino-imino-isoindolenine nitrate formed in excellent purity is washed with water and dried. The yield amounts to 198 parts of amino-imino-isoindolenine corresponding to 95% of theory.

*Example 2*

A mixture of 147 parts of phthalimide, 180 parts of urea, 90 parts of ammonium nitrate, 0.3 part of ammonium molybdate and 500 parts of nitrobenzene is stirred for 8–10 hours at 170° C.

After some hours almost colorless needles of amino-imino-isoindolenine nitrate begin to precipitate from the clear yellow brown solution. About 10 hours later the conversion of phthalimide into amino-imino-isoindolenine nitrate is completed in almost quantitative yield. The reaction product is sucked off at 150° C., washed with hot nitrobenzene and methanol and dried. The melting point of the new intermediate product is at about 280° C.

For conversion into the free base $C_8H_7N_3$ 40 parts of sodium hydroxide are introduced in portions with stirring at 0° C. into 208 parts of amino-imino-isoindolenine nitrate suspended in 1000 parts of water.

The granular mass is readily converted into a crystalline paste consisting of colorless needles of amino-imino-isoindolenine, which are sucked off and washed with some saturated common salt solution and dried.

140 parts of the free base are obtained. The amino-imino-isoindolenine melts at about 200° C. while splitting off ammonia.

*Example 3*

148 parts of phthalic anhydride,
160 parts of ammonium nitrate,
300 parts of urea,
100 parts of nitrobenzene and
1 part of ammonium molybdate are heated with stirring for one hour each at 140°, 150° and 160° C., then for another 15 hours at 160–170° C. and at last for 2 hours at 180–190° C.

Phthalic anhydride is dissolved during reaction, thereupon phthalimide crystallizes out and is completely redissolved. At last, the amino-imino-isoindolenine-nitrate crystallizes almost quantitatively at reaction temperature. The thick paste thus obtained is stirred with 200 parts of methanol at about 60° C., sucked off, washed with methanol and dried.

A practically pure amino-imino-isoindolenine-nitrate is thus obtained in a yield of about 95 per cent of the theoretical.

*Example 4*

A mixture of 162 parts of phthalic diamide, 300 parts of urea, 160 parts of ammonium nitrate, 1 part of ammonium molybdate and 750 parts of nitrobenzene is heated with stirring for 20 hours at 150–160° C.

Amino-imino-isoindolenine-nitrate formed during reaction crystallizes from the initially clear mixture. After completion of the reaction and cooling to 50° C. a great part of the nitrobenzene used can be removed. After further cooling the residual mixture is pasted up with an acetone-water-mixture (about 3:1), sucked off at room temperature, washed again with some acetone-water-mixture, subsequently with water and dried. Amino-imino-isoindolenine-nitrate is obtained in excellent yield and purity.

*Example 5*

A mixture of 146 parts of mono-iminophthalimide, prepared according to British specification No. 520,415, Example 11, or according to Braun Berichte 40.2709, 120 parts of urea, 90 parts of ammonium nitrate, 0.3 part of ammonium molybdate and 500 parts of nitrobenzene is stirred for about 6 hours at 170° C. Amino-imino-isoindolenine-nitrate precipitated in a good yield is sucked off at about 150° C., washed with hot with hot nitrobenzene and wth cold methanol and dried.

*Example 6*

A mixture of:
147 parts of phthalimide,
180 parts of urea,
206 parts of p-toluene sulfonic acid,
0.3 part of ammonium molybdate and
600 parts of trichlorobenzene is stirred for 6–8 hours at 170° C. This mixture is diluted with hot chlorobenzene, the precipitated paste consisting of grey needles is sucked off while hot, washed with hot chlorobenzene and with cold methanol and water and subsequently dried.

The salt of amino-imino-isoindolenine with p-toluene sulfonic acid thus obtained is very difficultly soluble in water and exhibits similar properties as the nitrate or the base, especially the capability of being easily converted into phthalocyanine.

*Example 7*

74 parts of phthalic anhydride,
150 parts of urea,
60 parts of methane ammonium sulfonate and
0.5 part of ammonium molybdate are heated for one hour each at 140°, 150° and 160° C. and for another 15 hours at 170° C. After cooling the melt thus obtained is crushed, pasted up with methanol, sucked off, washed with some methanol and the methane sulfonic acid amino-imino-isoindolenine thus obtained is dried. The reaction product contains traces of phthalocyanine. The formation of phthalocyanine may be prevented by adding small quantities of an oxidizing agent, for instance, ammonium persulfate, to the reaction mixture after the initially precipitating phthalimide has been redissolved.

*Example 8*

74 parts of phthalic anhydride,
150 parts of urea,
26 parts of ammonium chloride and
0.5 part of ammonium molybdate are heated for one hour each at 140°, 150° and 160° C. and stirred for another 15 hours at 160°–170° C. After the initially precipitated phthalimide has completely or mainly been dissolved again, 8 parts of ammonium perchlorate are added to the reaction mixture apportioned within the remaining reaction time. The formation of traces of phthalocyanine is thus completely or almost completely prevented.

The reaction mixture is gradually cooled, 50 parts of formamide are added at 120° C. and after stirring once, 300 parts of methanol are immediately added to the mixture which after thorough stirring is rapidly cooled to room temperature, sucked off after 1–2 hours. The reaction product obtained is washed with methanol and dried.

The product represents amino-imino-isoindolenine-hydrochloride crystallizing in white needles and is thus obtained in analytically pure form.

The portions of the base contained in the filtrate can be precipitated as nitrate by stirring into ice cold, dilute nitric acid.

*Example 9*

74 parts of phthalic anhydride,
150 parts of urea,
27 parts of ammonium chloride and
1 part of ammonium molybdate are heated with stirring for 6 hours at 180° C. A clear, olive-green melt is thus obtained. The melt is dissolved in 400 parts of formamide at 20–50° C., the slight traces of phthalocyanine contained therein are separated by filtering and the solution is saturated with dry ammonia. The solution is stirred for some hours, at least at 0° C., sucked off, the filter cake obtained is washed with acetone and dried. The reaction product generally shows a composition of 51–52% C, 5–6% H, 11–12% O, 30–31% N. It probably consists for the most part of carbaminylamino - carbaminyl - imino - isoindolenine, ($C_{10}H_9O_2N_5$).

*Example 10*

A mixture of 147 parts of phthalimide, 300 parts of urea, 250 parts of naphthalene-1-sodium-sulfonate and 1 part of ammonium molybdate are stirred into a solution of 50 parts of sulfuric acid in 500 parts of water.

The mixture is heated to 150–160° C. while distilling off the water and stirred at this temperature for about 20 hours.

Isolation is achieved by stirring the cooled melt with about 2400 parts of methanol. Besides sodium sulfate a part of the amino-imino-isoindolenine naphthalene-1-sulfonate formed does not go into solution. This part is sucked off and the sodium sulfate is washed off with water.

The filtrate containing methanol is stirred into a mixture of ice, about 250 parts of the sodium salt of naphthalene-1-sulfonic acid and 500 parts of glacial acetic acid.

The reaction product dissolved in methanol precipitates thereby as amino-imino-isoindolenine naphthalene-1-sulfonate. Both parts are technically pure.

The products may further be purified by treating with benzene and with diluted solution of acetic acid and naphthalene-1-sulfonic acid.

*Example 11*

128 parts of phthalonitrile are melted with 240 parts of urea and 80 parts of ammonium nitrate and stirred for 20 hours at 150–160° C. The cooled melt is made into a paste with water whereby any acid, preferably nitric acid, may be added until the reaction has become neutral or weakly alkaline. The nitrate of amino-iminoisoindolenine formed which is practically insoluble in cold water is sucked off and washed with water. The product is obtained in excellent yield and purity.

Example 12

128 parts of phthalonitrile,
300 parts of urea and
132 parts of diammonium phosphate are heated with stirring for several hours at about 150° C. A clear melt is formed which is extracted after cooling with water or dilute ammonium phosphate solution. The amino-imino-isoindolenine phosphate is separated from the filtrate by adding ammonium phosphate and the reaction product is purified by dissolving and reprecipitating with acetone-water-mixtures.

Example 13

74 parts of phthalic anhydride,
180 parts of urea,
80 parts of ammonium nitrate and
33 parts of diammonium phosphate are heated with stirring for one hour each at 140°, 150°, 160° and 170° C. and for another 35 hours at 180° C. Towards the end of the reaction the melt becomes substantially crumbly and dry. The cold reaction mixture is stirred with water and weakly acidified thereby, sucked off after 10 minutes, washed and dried. 116 parts of technically pure amino-imino-isoindolenine-nitrate are thus obtained.

The reaction product may be purified by recrystallization as follows:

50 parts of the technically pure product are suspended in 800 parts of water heated to 75° C., and 100 parts of 25% aqueous ammonia are immediately added. After vigorous stirring for 1–2 minutes the solution obtained is immediately run through a filter into a mixture of ice and 115 parts of concentrated nitric acid.

The precipitate formed is sucked off after 10–15 minutes, washed with some water and dried. 35 parts of analytically pure amino-imino-isoindolenine-nitrate are thus obtained.

Example 14

A mixture of:

210 parts of the nitrate of pyridine-2.3-dicarboxylic acid,
188 parts of ammonium nitrate and
3.6 parts of ammonium molybdate is introduced at 140° C. within one hour into a melt of 300 parts of urea. The temperature is slowly raised to 170–180° C. and stirring is continued at this temperature for about six hours. After completion of the reaction the solution is cooled down to 100° C. and cold water is stirred in. The crystallized nitrate of 4- or 7-aza-1-amino-3-imino-isoindolenine is sucked off, washed with cold water and acetone and dried. The yield amounts to 190 parts of the nitrate.

For conversion into the free base 100 parts of the nitrate are introduced at 0° C. into 2000 parts of water and dissolved by adding 145 parts of a 17.9% sodium hydroxide solution, the temperature being kept at 0° C. by cooling. After a short time the free base precipitates in crystalline form and is sucked off after 15 minutes, washed with some water, acetone and ether and dried in air or in vacuo. The yield amounts to 63 parts. The free base melts at 205–207° C. with decomposition.

Example 15

25 parts of 4-phenoxyphthalic acid are introduced at 110° C. into a melt of 12 parts of urea, 14.4 parts of ammonium nitrate and 0.3 part of ammonium hydrate and stirred for one hour at 175–180° C. until the initially formed long, thin prisms have been converted into short, coarse crystals whereby a mixture of 12 parts of urea and 12.4 parts of ammonium nitrate is still gradually added. The cooled melt is diluted with methanol and water, the precipitated nitrate of 5- or 6-phenoxy-1-amino-3-imino-isoindolenine respectively is sucked off and washed with methanol and water. If any mono-imino-phthalimide is present in the nitrate it is removed by boiling off with acetone.

The free base is obtained from the nitrate by introducing same into a solution of sodium methylate in acetone, the base dissolving thereby. The base is precipitated from the solution by adding water.

The 5- or 6-phenoxy-1-amino-3-imino-isoindolenine melts at 99° C. and is very easily soluble in methanol and, contrary to most amino-imino-isoindolenines, also soluble in acetone. The product dissolves in dilute acetic acid with weakly yellow coloration. By adding ammonium nitrate and acetic acid the product is precipitated from its solution in acetone in form of its difficultly soluble nitrate in colorless, clustered needles.

Example 16

11.6 parts of 4.5-diphenyl-phthalic anhydride are introduced at 110° C. into a melt of 5 parts of urea, 6 parts of ammonium nitrate and 0.1 part of ammonium molybdate and heated for one hour each at 140° C. and 155–160° C. and for further 14–15 hours at 175–180° C. until the initially formed long, thin needles have been converted into small, coarse crystals. The melt somewhat cooled on standing is diluted with methanol, the nitrate of 5.6-diphenyl-1-amino-3-imino-isoindolenine is sucked off and washed with methanol and acetone. The best method of isolating the free base consists in treating the nitrate with a solution of sodium methylate in dioxane.

Example 17

60 parts of urea,
55 parts of 3-chlorophthalic anhydride,
48 parts of ammonium nitrate and
0.5 part of ammonium molybdate are heated and worked up according to the method described in Example 14. 41 parts of the nitrate of 4- or 7-chloro-1-amino-3-imino-isoindolenine respectively are thus obtained.

Example 18

A mixture of:

56 parts of 4-phenylphthalimide,
60 parts of urea,
40 parts of ammonium nitrate and
0.3 part of ammonium molybdate is heated with stirring to 170° C. until the melt has become crumbly. Heating is then continued at the same temperature without stirring. After heating for totally 20 hours the cold melt is stirred with methanol, sucked off, the reaction product is washed with methanol and dried. 65 parts of the technically pure nitrate of 1-amino-3-imino-5-phenylisoindolenine or of 1-amino-3-imino-6-phenylisoindolenine are thus obtained.

Example 19

128 parts of phthalonitrile, 300 parts of urea and 125 parts of urea nitrate are stirred for several hours at about 150° C.

Further processing and isolation of the reaction product is performed as described in Example 11.

Example 20

204 parts of 3.4-dicyano diphenyl are added to a melt consisting of 480 parts of urea and 80 parts of ammonium nitrate and stirred for 30 hours at 150–160° C.

The cooled melt is ground with a solution of ammonium nitrate in water and acetic acid is added until the reaction has become neutral or weakly acid. The mixture is then sucked off and the product is washed with water. The phenyl-amino-imino-isoindolenine is obtained in a very pure state and excellent yield.

Example 21

128 parts of phthalonitrile, 300 parts of urea and 100 parts of p-toluene sulfonamide are melted and heated for several hours to 150–160° C. with stirring.

The initially clear melt changes to deep yellow and finally to light green. The cooled melt is dissolved in 60% acetone, filtered and the reaction product precipitated again by diluting the solution with water. The p-toluene sulfonamide-imino-isoindolenine obtained in a good yield is purified by recrystallization from an ethanol-benzene-mixture (ratio 1:1). According to elementary analysis the following values were found:

| found | calculated for $C_{15}H_{13}O_2N_3S$ |
|---|---|
| C=60.82% | C=60.17% |
| H= 4.56% | H= 4.38% |
| O=10.71% | O=10.70% |
| N=14.40% | N=14.05% |
| S=10.35% | S=10.70% |

*Example 22*

32 parts of phthalonitrile are heated with 95.6 parts of liquid ammonia in a stirring autoclave of chrome-nickel-steel for 5 hours at 110–118° C. (about 80 atmospheres overpressure). After cooling the NH₃ is blown off and the solid, light blue-grey residue (37.6 parts) is ground several times with water previously heated to 40–50° C. and sucked off until the residue has no longer a bitter taste. For removing any slight amounts of phthalonitrile the residue is boiled off with water, about 1.5 parts of deep blue small needles of practically metal-free phthalocyanine remaining behind thereby. The aqueous extract solidifies on cooling to a viscous paste of colorless small needles of amino-imino-isoindolenine which after sucking off, cautiously washing with some water and drying, melt at 192–195° C.

*Example 23*

128 parts of phthalonitrile are heated to 140° C. with 80 parts of ammonium nitrate in 4000 parts of liquid ammonia while stirring for 20 hours in an autoclave.

The crude amino-imino-isoindolenine-nitrate remaining after distilling off the ammonia is purified by treatment with cold water and hot benzene.

*Example 24*

30 parts of phthalonitrile are dissolved at about 110° C. in 32 parts of monoethanolamine and kept at this temperature. After solidifying the reaction mixture is ground and washed with ethanol. 1-oxethylamino-3-oxethylimino-isoindolenine is obtained in quantitative yield. In order to prevent overheating and to facilitate isolation the reaction mixture may be diluted with a solvent, for instance, an alcohol.

*Example 25*

16 parts of phthalonitrile are dissolved in 50 parts of glycol at 130–140° C. and while passing ammonia over the mixture stirred for 2–3 hours each at 120–130° C., 100–110° C., 80–90° C., 50–60° C. and finally at 0° C. with cooling.

The glycolate of amino-imino-isoindolenine $C_8H_7N_3.C_2H_6O_2$ crystallizes in abundant quantity in analytically pure form and may be easily isolated by sucking off and washing with acetone.

*Example 26*

13 parts of phthalonitrile and 0.1 part of copper chloride are stirred into 100 parts of monoethanolamine.

Phthalonitrile goes into solution and 1-oxethylamino-3-oxethylimino-isoindolenine crystallizes. The product can easily be isolated in a quantitative yield by sucking off and washing with alcohol.

*Example 27*

50 parts of phthalonitrile and 0.5 part of copper sulfate are suspended in 250 parts of methanol and the mixture is saturated with ammonia. Phthalonitrile gradually dissolves at 20–70° C. A blue-grey, finely crystalline copper complex salt of amino-imino-isoindolenine precipitates. Moreover, 30 parts of the free base $C_8H_7N_3$ precipitate in coarse crystals. The chief portion remaining dissolved can be precipitated as nitrate by stirring the mixture into weakly acidified water containing nitrate. A quantitative total yield is obtained.

The reaction proceeds more slowly in formamide, however, may equally be performed in other alcohols, such as ethanol, glycol. Similar or better results are attained on replacing CuSO₄ by other copper salts, such as CuCl, CuCl₂, 2H₂O, CuNO₃.3H₂O, glycocoll copper, acetylacetone-copper, or also salts of copper, nickel, cobalt, cadmium etc., or active metals, for instance, Raney-nickel. Depending on the conditions applied the reaction is accomplished within 2–70 hours.

*Example 28*

A sodium methylate solution consisting of 3 parts of sodium and 128 parts of anhydrous methanol is poured onto 128 parts of phthalonitrile.

The mixture is vigorously stirred with cooling, however, towards the end of the reaction which is accomplished within a few minutes the temperature is allowed to raise up to 50° C. or also up to the boiling point of the mixture. The color of the mixture changes thereby from yellow to orange and finally to deep dark red brown. As soon as the phthalonitrile has completely dissolved the temperature is reduced below 50° C. and gaseous ammonia is passed over the solution with stirring. After some time 1-amino-3-imino-isoindolenine begins to precipitate as thick crystal paste. The mixture is further stirred for some hours, diluted with 128 parts of acetone, further saturated with ammonia, the temperature is lowered to 0° C., the solution is sucked off, the precipitate is washed with acetone until the washing has become colorless, and dried.

100 to 105 parts of 1-amino-3-imino-isoindolenine corresponding to 70% of the theoretical are thus obtained. The product is yellowish colored. A completely colorless product is obtained by carrying out the reaction at lower temperatures with one and a half to two times the quantity of alcohol and three to five times the quantity of sodium, the yield being somewhat impaired thereby.

The portions of the reaction product remaining dissolved after sucking off and washing may be precipitated as nitrate.

*Example 29*

50 parts of sodium are dissolved in 320 parts of anhydrous ethyl alcohol. The mixture which solidifies after cooling is dissolved in 1130 parts of formamide. At 50° C. 204 parts of 3.4-dicyano diphenyl are introduced with stirring until after a few hours the dinitrile has dissolved. The reaction mixture soon solidifies to a crystal paste which is cooled and kept at room temperature for several hours. The precipitated product is separated by suction, the part remaining dissolved is precipitated by adding water. The monohydrate of 1-amino-3-imino-5(or 6)-phenyl-isoindolenine is obtained in excellent purity and yield from both parts by recrystallization from a mixture of acetone and water (about 1:1).

*Example 30*

40 parts of calcium are dissolved in 400 parts of anhydrous methanol. 1130 parts of formamide are added at room temperature, whereupon 128 parts of phthalonitrile are introduced.

The solution is stirred for a few hours at 70–80° C. The initially yellow solution which changes to yellow green is introduced when cold into a mixture of ice, ammonium nitrate and nitric acid. The precipitate formed thereby is sucked off and washed with water. After drying the crude product is boiled out with acetone and sucked off again. The nitrate of the amino-imino-isoindolenine thus obtained is not yet quite pure. Purification may be achieved as indicated in Example 13.

Reaction may also take place without the use of alcohol in such a manner that the calcium is dissolved in formamide at temperatures of about 70° C. and the phthalonitrile is introduced with stirring after cooling.

When working in this manner the possibility of dyestuff formation being initiated is much greater.

*Example 31*

14 parts of lithium are dissolved in 400 parts of anhydrous ethanol. 1130 parts of formamide are added at room temperature and 128 parts of phthalonitrile are introduced with stirring.

The reaction mixture is heated for some hours to 70–80° C. Further processing is done as indicated in Example 30.

The nitrate of amino-imino-isoindolenine is obtained in a yield of 80% of theory. Similar conditions as indicated in Example 30 with regard to calcium may be applied in a reaction carried out without alcohol.

*Example 32*

46 parts of sodium are dissolved in 800 parts of anhydrous methanol and after cooling there are introduced with stirring 128 parts of phthalonitrile dissolving with slight self-heating. Into the mixture is stirred a solution of 342 parts of p-toluene sulfonamide in 800 parts of anhydrous methanol and the mixture is heated for 4 hours at about 90° C. The 1-p-toluene sulfonamino-3-imino-isoindolenine is thus formed.

By stirring the reaction mixture into an ammonium salt solution cooled with ice the reaction product precipitates. The precipitate is purified by boiling out with ethanol and with benzene. This sulfonamide compound does not form a difficultly soluble nitrate.

*Example 33*

128 parts of phthalonitrile are introduced into a mixture of 86–90 parts of piperidine and a sodium methylate solution consisting of 2 parts of sodium and 45–50 parts of methanol.

The phthalonitrile dissolves within a very short time. The heat being set free is discharged to such an extent that the temperature raises only to about 50° C.

1-piperidino-3-imino-isoindolenine precipitates in colorless needles already at the reaction temperature or after cooling. Isolation is effected by diluting the reaction mixture with 80–100 parts of acetone. The mixture is sucked off when cold and the precipitate is washed with cold acetone and benzine. The product obtained is analytically pure and shows a flash point of 120° C.

*Example 34*

46 parts of sodium are dissolved in 800 parts of anhydrous ethanol. 430 parts of piperidine are added and 204 parts of 3.4-dicyano diphenyl are dissolved in the mixture with stirring and heating.

This solution from which impurities, if any, may be removed by filtration is heated for 2–3 hours at about 90° C. and then cooled. The reaction mixture (from which on longer standing small amounts of the base formed, precipitate) is then stirred into a mixture of ice and 200 parts of nitric acid. The nitrate of the 5- or 6-phenyl-1-piperidino-3-imino-isoindolenine is thus obtained in good yield. The precipitate is sucked off, washed with water and dried. The product may be recrystallized from an alcohol-benzene mixture (about 1:1). The nitrate melts at about 215–220° C. with dark coloration. According to elementary analysis the compound exhibits the following composition:

| found | calculated for $C_{19}H_{20}O_3N_4$ |
|---|---|
| C=64.05% | C=64.74% |
| H= 4.20% | H= 5.72% |
| N=15.85% | N=15.91% |
| O=14.28% | O=13.63% |

*Example 35*

46 parts of sodium are dissolved in 800 parts of ethanol. To this mixture are added after cooling 300 parts of n-butylamine and 128 parts of phthalonitrile.

The mixture is heated to 90° C. with stirring. After about 4 hours' stirring the butylamino-imino-isoindolenine begins to precipitate at this temperature. The product is most easily isolated as nitrate by stirring the reaction mixture into cold dilute nitric acid.

The following values for the nitrate were obtained according to elementary analysis:

| found | calculated for $C_{12}H_{18}O_3N_4$ |
|---|---|
| C=55.22% | C=54.51% |
| H= 6.44% | H= 6.11% |
| O=18.20% | O=18.17% |
| N=21.20% | N=21.21% |

*Example 36*

80 parts of pulverized sodium amide are introduced into 850 parts of formamide in portions at 0° C. while stirring and cooling with a freezing mixture of ice and sodium chloride. 128 parts of phthalonitrile are added in portions to the clear solution and the temperature is raised to 60–70° C. A yellow solution is obtained from which colorless prismatic needles precipitate.

After 6–8 hours the solution is cooled, the amino-imino-isoindolenine obtained in good yield is sucked off, washed with some formamide and acetone and dried. By introducing the filtrate into a mixture of ice and nitric acid containing as much nitric acid as is required for neutralization and salt formation, a further quantity of amino-imino-isoindolenine is obtained as nitrate.

*Example 37*

80 parts of pulverided sodium amide are introduced in portion at 0° C. into 1130 parts of formamide while stirring and cooling with a freezing mixture of ice and sodium chloride. 204 parts of 3.4-dicyano diphenyl are gradually added to the solution. The temperature is then slowly raised to 50° C. A yellow solution is formed from which grey crystals precipitate. After about 6 hours the solution is cooled, the hydrate of phenyl-amino-imino-isoindolenine obtained in almost quantitative yield is sucked off, washed with some formamide and acetone and dried.

*Example 38*

12.2 parts of sodium amide are introduced into 150 parts of formamide at 0° C. with cooling and stirring. 30 parts of 4.5-dichlorophthalonitrile are added in portions to the clear solution. After gradually raising the temperature to 40° C. and stirring at this temperature for 12 hours the mixture is cooled and sucked off, the precipitate obtained is washed with acetone and ether and dried. The yield amounts to 27 parts of 4.5-dichloro-1-amino-3-imino-isoindolenine decomposing at about 265° C. while splitting off ammonia.

*Example 39*

60 parts of formamide, 3.5 parts of sodium amide and 107 parts of 3.4-dicyanodiphenylsulfone are reacted as described in Example 38. 9 parts of 1-amino-3-imino-iso-indoleninyl-5- or -6-phenylsulfone decomposing at about 215° C. while splitting off ammonia are thus obtained.

*Example 40*

32 parts of pulverized sodium amide are introduced in portions into 320 parts of formamide at 0° C. with stirring and cooling with a freezing mixture of ice and common salt. 53 parts of Δ-4.5-4-methyl-tetrahydrophthalonitrile are added in portions to the clear solution. The temperature is allowed to raise to room temperature, whereby colorless crystals more and more precipitate from the initially yellow and then violet red colored solution. After about 12 hours tetrahydrated amino-imino-methyl-isoindolenine formed is sucked off and washed with acetone and ether. The product decomposes at about 130° C. while splitting off ammonia.

The new substance is converted into the corresponding tetramethyloctahydrometal-phthalocyanine with dehydrogenation by means of metal salts, for instance, salts of copper, nickel and cobalt, in the presence of reducing agents, such as glycol or formamide, already at temperatures of about 100° C., whereby between the hydrocarbons having anellated the hetero ring a new double bond is formed and the hydrogen being set free is used for the formation of the blue red leuco compounds. The new phthalocyanine dissolves in concentrated sulfuric acid with blue coloration. On gently heating the blue solution changes to brown, tetramethyl-copper-phthalocyanine being formed with further dehydrogenation.

If, however, the tetrhydrogenated amino-imino-methyl-isoindolenine is heated in nitrobenzene in the presence of a copper salt for a longer time tetramethyl-copper-phthalocyanine is immediately obtained.

*Example 41*

15.6 parts of sodium amide are dissolved at 0° C. with cooling and stirring in 90 parts of formamide. 17.8 parts of 1.2.4.5-tetracyanobenzene (prepared from pyrromellitic acid tetraamide by conventional methods) are added in small portions to the clear solution. A deep red solution is formed from which yellow, prismatic needles soon precipitate which are sucked off after one hour's stirring at room temperature, washed with some formamide and acetone and dried. The benzodi (amino-imino-pyrrolenine) obtained in good yield decomposes on heating without melting.

*Example 42*

40 parts of sodium amide are dissolved at 0° C. in 300 parts of formamide with stirring. 60 parts of 3.3'.4.4'-tetracyanodiphenyl are added in portions to the clear solution and gradually heated to 40–60° C., a yellow brown solution being formed thereby. After about one hour's stirring the solution is cooled with ice. Di(amino-imino-isoindoleninyl) precipitates in nearly quantitative yield in yellow, fine, small needles, which are sucked off, washed with some formamide and acetone and dried. Di(amino-imino-isoindoleninyl) decomposes on heating without melting.

*Example 43*

64 parts of phthalonitrile are dissolved at 10° C. in 2000 parts of anhydrous benzene and 23 parts of absolute alcohol are added. Thereupon dry hydrogen chloride is passed over the mixture at 5–10° C. for 48 hours and the crystalline precipitate is sucked off, washed with dry benzene and dried in vacuo. The yield amounts to 63 parts.

40 parts of the imino-ether thus obtained are introduced at 0° C. into a solution of 50 parts of ammonia in 400 parts of methanol and the methanol is evaporated in vacuo.

44 parts of a residue which is dissolved at 0° C. in 200 parts of about 80% nitric acid are obtained. On pouring the solution onto small pieces of ice the nitrate of 1-amino-3-imino-isoindolenine is precipitated, sucked off, washed with water and dried in air.

Replacing phthalonitrile by the equivalent quantity of 3.4-dicyanodiphenyl the nitrate of 1-amino-3-imino-5- or -6-phenylisoindolenine is obtained.

*Example 44*

102.4 parts of phthalonitrile are introduced at 20° C. into a solution of 4.6 parts of sodium in 81 parts of methanol diluted with 450 parts of benzene.

Stirring is continued until the phthalonitrile has been dissolved with yellow coloration. Thereupon 20.4 parts of ammonia (100%) dissolved in methanol and 0.9 part of water are added and it is further stirred at 20° C. until a test portion gives no longer a stable, blue leuco compound in methyl alcoholic aqueous solution with dilute sodium hydroxide solution and sodium hydrosulfite. 64.4 parts of formic acid are allowed to run into the solution which is still stirred for some time; the crystalline precipitate formed is sucked off, washed with benzene and dried in vacuo. About 167.7 parts of formate corresponding to 94.5 parts of 1-amino-3-imino-isoindolenine or 85.6% of the theoretical are thus obtained.

By replacing formic acid by equivalent amounts of other carboxylic acids corresponding salts of the acids are obtained.

*Example 45*

35.6 parts of 1.2-dicyanonaphthalene are introduced into a solution of 1.15 parts of sodium in 40.4 parts of methyl alcohol diluted with 182.5 parts of benzene and stirred until the 1.2 dicyanonaphthalene has been dissolved with yellow coloration. Thereupon 20.4 parts of ammonia (100%) dissolved in methanol are added and stirred until a test portion gives no blue leuco compound in methyl-alcoholic, aqueous solution. The precipitate obtained in a good yield (amounting to 70% of the theoretical) is suck off and washed with benzene and ligroin and dried in vacuo. The crude product is obtained by concentrating its methyl-alcoholic solution in small, coarse crystals melting at 204–208° C. with green coloration.

*Analysis.*—Calculated: C=73.9%, H=4.61%, N=21.52%. Found: C=73.78%, H=4.35%, N=21.21%, O=0.77%

The 1-amino-3-imino-4.5-benzo-isoindolenine is difficultly soluble in cold methanol, dissolves in methyl-alcoholic sodium hydroxide solution with weakly yellow coloration, however, precipitates again on adding water because of the sodium salt being hydrolized. The product is difficultly soluble in acetone and comparatively difficultly soluble in cold pyridine. It dissolves in dilute acetate acid with yellow coloration and precipitates as difficultly soluble nitrate in yellow needles by adding ammonium nitrate. It is soluble in dilute hydrochloric acid with yellow coloration but precipitates again immediately as yellow hydrochloride which is converted into colorless needles on boiling.

*Example 46*

11.0 parts of 3'.4'-dicyano-(C)-phenyl-6-methyl-benzthiazol are introduced into a solution of 0.23 part of sodium in 55.4 parts of methanol diluted with 45.6 parts of benzene and stirred until the starting product has almost completely been dissolved. Thereupon 4.1 parts of ammonia (100%) dissolved in methanol are added and the solution is kept at 35–40° C. until a test portion gives no longer a blue leuco compound. The crystalline precipitate is sucked off, washed with benzene and ligroin and dried in vacuo.

Amino-imino-isoindoleninyl-methylbenzthiazol is obtained in a yield of about 90% of the theoretical as greenish grey powder containing already small quantities of phthalocyanine and slightly dissolving in methanol and acetone. The product is soluble in dilute acetic acid with weakly yellow coloration and precipitates as slightly soluble, weakly yellow nitrate when adding ammonium nitrate solution. The melting point of the product containing about ½ molecule of methanol is at about 262–264° C.

Example 47

18.96 parts of 4-methoxyphthalonitrile are introduced at 20° C. into a solution of 0.69 part of sodium in 12.1 parts of methanol diluted in 67.5 parts of benzene and stirred until the starting product has been dissolved with yellow coloration. Thereupon 12.24 parts of ammonia (100%) dissolved in methanol are added and stirring is continued until a test portion gives no stable blue leuco compound in dilute sodium hydroxide solution and sodium hydrosulfite. The solution is then concentrated to a small volume in vacuo, the crystals precipitating after some time are sucked off, washed with benzene and ligroin and dried in vacuo. 5- or 6-methoxy-1-amino-3-imino-isoindolenine is obtained in good yield in rod-shaped colorless crystals becoming green at 180° C. and decomposing at 202° C. The 5- or 6-methoxy-1-amino-3-imino-isoindolenine is soluble in water, insoluble in methanol, difficultly soluble in acetone and gives a slightly soluble nitrate. The portions of the product remaining in the benzene mother liquor may be precipitated by adding ammonium bicarbonate.

The melting point of the carbonate extracted from the crude salt mixture with methanol and precipitated with acetone is 258–261° C.

By replacing 4-methoxy-phthalonitrile by the equivalent amount of 4-ethoxy-phthalonitrile 5- or 6-ethoxy-1-amino-3-imino-isoindolenine is obtained after removing a difficulty soluble by-product melting at 217–218° C. and after concentrating the benzene solution. The latter product has a melting point of 182–185° C. and exhibits similar properties as the above-said methoxy-compound.

Example 48

2.3 parts of sodium are dissolved in ethanol and the solution is concentrated to 18–23 parts, stirred with 52–64 parts of liquid ammonia at about −30° C. and 12.8 parts of finely ground phthalonitrile are rapidly stirred in. The starting product is almost completely dissolved while extracting ammonia by vigorously boiling and 1-ethoxy-3-imino-isoindolenine is then precipitated. The reaction product is isolated after 10 minutes by diluting the reaction mixture with 100 parts of ice+water, sucking off, washing with water and drying in vacuo at 30–40° C., in a yield of 92% of the theoretical. 16 parts of diethoxy-imino-dihydro-isoindolenine thus obtained are heated with 36.4 parts of concentrated aqueous ammonia on the water-bath. The product is dissolved within 3 minutes at 60–65° C. Traces of non-dissolved portions are removed by filtering and the solution is chilled. A thick paste of colorless, almost rectangular small crystals—which are visible by means of a microscope—is formed. The product is sucked off, washed with some water and dried. The yield amounts to 9 parts of amino-imino-isoindolenine. By adding 5 parts of ammonium nitrate to the aqueous filtrate and to the wash water further 4.7 parts of the slightly soluble nitrate precipitate.

On replacing ammonia by methylamine or dimethylamine or other mono- or dialkylamines the reaction yields a series of well-defined products wherein not only the alkoxy—but also the imino-group is partly exchanged against alkylamino radicals.

Example 49

11 parts of diethoxy-imino-dihydro-isoindolenine are heated with 36 parts of aniline on the water bath as described in Example 49. The starting product dissolves within 10 minutes at about 80° C. with deep yellow coloration and presently light yellow small crystals precipitate. After stirring at 95° C. for another 15 minutes the solution is cooled down to 20° C., sucked off, the precipitate is washed with methanol and dried. About 7 parts of 1-anilino-3-imino-isoindolenine forming greenish yellow, coarse small crystals melting at about 190–207° C. with decomposition and orange coloration are obtained.

On acidifying the filtrate obtained as described above with dilute hydrochloric acid a slightly soluble, full, yellow colored hydrochloride precipitates. According to analysis the product obtained is a monohydrochloride of 1-phenylamino-3-phenylamino-isoidolenine.

Example 50

7.1 parts of 4-methylphthalonitrile are introduced at 20° C. with stirring into a solution of 0.29 part of sodium in 5.05 parts of methanol diluted with 28.1 parts of benzene and stirring is continued at 20° C. until the intensity of the yellow solution is not further increased. Thereupon 1.28 parts of ammonia (100%) dissolved in methanol are added and stirring is continued until a test portion gives no longer a blue leuco compound with dilute sodium hydroxide solution and sodium hydrosulfite. The crystallized 5- or 6-methyl-1-amino-3-imino-isoindolenine is sucked off and washed with benzene and ligroin. The product yields colorless, full, long prisms becoming green blue at 170° C., sintering at 181–182° C. and decomposing at 189–190° C. with blue coloration.

The portions of the base remaining dissolved in the original reaction liquid may be precipitated with formic acid as formate which may be purified by dissolving in water and precipitating with acetone.

Example 51

80.7 parts of a methanol solution containing about 8.0 parts of anhydrous sodium sulfide are mixed with 12.8 parts of finely distributed phthalonitrile at 20° C. The temperature rises within 15 minutes to 35–40° C. while the dinitrile dissolves with deep yellow—temporarily deep green-yellow—coloration. The solution is stirred for another quarter of an hour and 20.0 parts of glacialacetic acid are gradually added drop by drop, the addition product formed thereby precipitating in crystalline form with brownish coloration. The product is sucked off and washed with methanol. The yield amounts to 13.4 parts of a product which takes on heating a very dark color and sinters at 220–225° C. with decomposition. One part of a somewhat less pure product still precipitates from the mother solution by adding water. According to its chemical behavior, mode of origin and elementary analysis the product formed is the mercapto-imino-isoindolenine or in the tautomeric form imino-thio-phthalimide. With aqueous sodium hydroxide solution an orange colored sodium salt is obtained being difficultly soluble when cold and dissolving on heating with orange coloration. The product dissolves in pyridine with red coloration and can be crystallized from this solvent. The pyridine salt first precipitating thereby decomposes on washing with methanol and shows again a light grey brown color. With dilute hydrochloric acid a reddish grey salt is obtained which temporarily dissolves on heating, however, after some time deposits in reddish grey needles, presumably consisting of thiophthalimide and phthalimide.

With methanolic sodium hydrosulfide solution—prepared by cold saturation of a solution of anhydrous $Na_2S$ in methanol with $H_2S$ and filtering off the precipitated sulfur—the mercapto-imino-isoindolenine described herein is obtained on heating within a short time. In this case the product deposits directly on cooling as orange colored sodium salt.

On boiling the mercapto-imino-isoindolenine in nitrobenzene for a short time blue needles with a metallic lustre of metal-free phthalocyanine precipitate, hydrogen sulfide escaping thereby.

16.2 parts of mercapto-imino-isoindolenine in 147 parts of pyridine are mixed with 12 parts of ammonium nitrate with stirring. By gently heating on the water bath the starting product dissolves within 10 minutes, an almost colorless compound precipitating from the red brown solution in a crystalline form. After stirring for half an hour at 90° C. the solution is sucked off, the precipitate is washed with pyridine until clear, washed again with water and dried. The almost colorless residue crystallizes from dilute aqueous ammonia in colorless needles and displays all properties of the amino-imino-isoindolenine-nitrate.

*Example 52*

1000 parts of acetamide and 128 parts of phthalonitrile are introduced into a solution of 150 parts of potassium hydroxide in 400 parts of technical methanol. The solution thus obtained is heated for some time at 70° C. and is stirred still hot into a mixture of 1000 parts of ammonium nitrate and ice. The precipitating amino-imino-isoindolenine-nitrate is sucked off, washed with water and dried. By boiling out with benzene and acetone the reaction product is obtained in good purity.

*Example 53*

145 parts of amino-imino-isoindolenine are stirred with 500 parts of aniline at 50–60° C., the base slowly dissolving and anilino-imino-isoindolenine or its tautomeric forms crystallizing thereby while gaseous ammonia escapes.

After 5 hours the solution is cooled with ice, sucked off, the precipitate is washed with methanol or acetone and dried. The light yellow product melting at 208° C. is obtained in analytically pure form. The yield amounts to 95% of the theoretical.

On carrying out the reaction in boiling methanol the quantity of aniline may be reduced to about 100 parts.

*Example 54*

145 parts of amino-imino-isoindolenine and 200 parts of aniline are heated with stirring.

The monosubstitution product temporarily crystallizing and redissolving on further heating is initially formed with splitting off of ammonia. The temperature is then raised to 200° C. and the solution is kept at this temperature until the splitting off of ammonia is practically complete. The initially clear melt has now become deep yellow. 1-phenylamino-3-phenylimino-isoindolenine crystallizes on cooling. Isolation is achieved by diluting the melt chilled to about 50° C. with benzene or acetone to double the volume, cooling with ice and further diluting with benzine.

The pure base is colorless, dissolves in alcohols, acetone and benzene and melts at 130° C. with yellow coloration and may be distilled at 165–168° C. under 5 mm. pressure without decomposition. The salts of the base are deep yellow colored. The product is obtained in a quantitative yield.

The addition product of 1 mol of aniline to 1 mol of phenylamino - 3 - phenylimino - isoindolenine temporarily crystallizes under the said conditions. This product melts at 78–79° C. and splits off again the added aniline at 90–100° C.

*Example 55*

20 parts of amino-imino-isoindolenine and 30 parts of o-anisidine are heated with stirring as fast as possible in view of the active splitting off of ammonia and the solution is kept at 150° C. for 15 minutes, the base charged being initially dissolved in anisidine. Presently the reaction product crystallizes already at the reaction temperature. The reaction mixture is then cooled, stirred with methanol, sucked off when ice-cold, the precipitate is washed with methanol and dried. o-Methoxy-anilino-imino-isoindolenine or its tautomers respectively are obtained in analytically pure form. The light yellow product melts at 195–200° C.

*Example 56*

20 parts of amino-imino-isoindolenine and 30 parts of m-anisidine are heated with stirring at 150° C. until after 30 to 50 minutes splitting off of ammonia is practically complete.

The cold, deep yellow melt is diluted with methanol and the deep yellow chloride of m-methoxyanilino-m-methoxy-phenylimino-isoindolenine is precipitated by means of hydrochloric acid.

*Example 57*

5 parts of amino-imino-isoindolenine are gently heated with excess cyclohexoxypropylamine

(c-C$_6$H$_{11}$OC$_3$H$_6$NH$_2$)

with stirring. At 70–80° C. ammonia readily escapes. Thereupon the mixture is dissolved in water and weakly acidified with nitric acid. Crystallization of cyclohexoxy-propylamino - cyclohexoxy - propylimino-isoindolenine-nitrate is completed by adding a solution of ammonium nitrate. On heating in glycol with copper acetate the product gives an easily soluble, brightly orange colored copper complex.

*Example 58*

20 parts of technical amino-imino-isoindolenine-nitrate are suspended in 100 parts of methanol at room temperature and 24 parts of monoethanolamine are rapidly added, the starting product being immediately dissolved thereby. Impurities in the solution are sucked off as fast as possible and the filtrate is stirred for some time. Oxyethyl-amino-oxyethylimino-isoindolenine obtained in a quantitative yield is colorless and melts at 196° C.

In form of the free base the product is insoluble in most customary solvents when cold.

The reaction may also be accomplished in aqueous solution.

*Example 59*

20 parts of amino-imino-isoindolenine are reacted with 40 parts of p-nitraniline in boiling glacial acetic acid.

After the starting product has initially been dissolved 1.4' - nitrophenylamino - 3.4'' - nitrophenyl-imino-isoindolenine precipitates in light yellow small needles melting at 311–312° C.

The product yields a sodium salt crystallizing from aqueous methanol in long, deep red needles which is hydrolized again with much water.

*Example 60*

400 parts of copper acetate are dissolved with stirring at 100–120° C. in 4500 parts of formamide; 128 parts of phthalonitrile are added and the mixture is stirred for 30 minutes at 160° C. Yellow to copper red colored needles are precipitated in good yield, sucked off after cooling, washed with some formamide and alcohol and dried. They contain 35.83% of C
3.18% of H
7.67% of O
14.89% of N
35.70% of Cu 344 parts of the copper compound thus obtained are introduced at 0° C. with cooling and stirring into 3000 parts of nitric acid having a specific gravity of 1.5

After stirring for half an hour the red crystals are dissolved. Copper nitrate precipitates and is separated by filtration. The filtrate is then stirred into ice and the precipitated nitrate of amino-imino-isoindolenine is sucked off, washed neutral with cold water and dried.

Amino-imino-isoindolenine may also be obtained in equally good yield on carrying out the reaction under the same conditions, however, replacing the above-said complex copper compounds by those obtained as described in the following:

(a) A mixture of 147 parts of phthalimide, 180 parts of urea, 0.3 part of ammonium molybdate, 500 parts of nitrobenzene is stirred for one and a half hour at 160 to 170° C. Into this mixture are introduced 110 parts of cuprous chloride and kept for one and a half hours at 170–180° C. First a yellow crystalline precipitate is formed which soon becomes red brown. 450 parts of formamide are added and stirred for a further 90 minutes at 160° C.

The crystalline precipitate having changed to orange red and obtained in good yield is sucked off while hot, washed with hot nitrobenzene and formamide, then washed with cold ethanol and dried.

(b) 148 parts of phthalic anhydride are heated with 1200 parts of urea, 200 parts of cuprous chloride and 1 part of ammonium molybdate to 190–200° C. until the initially thinly liquid melt has been converted to a viscous paste. The reaction mixture is then diluted by adding 600 parts of nitrobenzene and further stirred for about one hour at 190–200° C. Further processing and isolation are achieved by diluting the mixture with 1130 parts of formamide, stirring for some time at 140–150° C., sucking off after further cooling and diluting with 800 parts of ethyl alcohol, washing the filtrate with hot formamide, hot water and alcohol and drying.

The reaction product obtained in excellent yield and purity has the following composition:

C=30.3%
H=2.7%
O=12.1%
N=21.6%
Cl=2.9%
Cu=28.1%

*Example 61*

A mixture of 130 parts of phthalonitrile and 150 parts of cuprous chloride is introduced at 150° C. in portions into 1700 parts of formamide with stirring within about 60 minutes.

The temperature is then raised to 180–200° C. and a smooth current of air conducted over the vigorously agitated reaction mixture. Thereby the initially yellow orange to light brown colored precipitate changes to a bronze colored to deep dark red rhombic crystallizate which is sucked off at 70–80° C., washed successively with formamide, water and methanol and dried.

The intermediate product thus obtained has the following composition:

33.8% of C
2.2% of H
0.4% of O
14.5% of N
7.1% of Cl
41.1% of Cu 305 parts of this compound are introduced in portions with vigorously stirring within 30 minutes into 1460 parts of an 80% nitric acid pre-cooled to 0° C. and kept at this temperature. The reaction mixture is stirred until a uniform greenish-white coloration is obtained, which happens after about 30 minutes.

The mixture is subsequently sucked off from the copper nitrate and the filtrate is washed again with about 290 parts of concentrated nitric acid. The combined filtrates or the non-filtered reaction mixture containing copper nitrate are introduced with stirring into an appropriate quantity of ice. The precipitation occurring is complete after about 30 minutes. The precipitate is sucked off, washed neutral with cold water and dried. The amino-imino-isoindolenine nitrate thus obtained is practically pure. The yield amounts to 184 parts corresponding to 85.5% of theory calculated on the phthalonitrile used as starting material.

*Example 62*

400 parts of copper acetate are dissolved at 100–120° C. with stirring in 4500 parts of formamide. 204 parts of 3.4-dicyano diphenyl are introduced into this mixture which is stirred for half an hour at 160° C. Orange colored needles precipitate in good yield and are sucked off after cooling and washed with some formamide and alcohol and dried. According to analysis the substance contains the elements C, H, O, N, Cu in the ratio 14:11:0.4:3:1.8.

420 parts of the orange colored compound are introduced at 0° C. with stirring into a mixture of 1500 parts of nitric acid (specific gravity 1.5) and 1000 parts of water. After half an hour the mixture is stirred into ice, the weakly yellowish, crystalline precipitate of 1-amino-3-imino-5(or 6)-phenylisoindolenine-nitrate is sucked off, washed neutral with water and dried. By treatment with the equimolecular quantity of caustic soda solution the free base is obtained from the nitrate as hydrate. Nitrate and base dissolve in concentrated sulfuric acid with yellow coloration.

*Example 63*

2 parts of the intermediate product containing copper obtained according to Examples 61 or 62 are suspended in 20 parts of cold glacial acetic acid. Within about 30 minutes 3 parts of cold 80% nitric acid are added while vigorously stirring and decreasing the temperature to 0° C.

Stirring is continued until the reaction mixture contains no longer any colored intermediate product. The white to greenish grey colored reaction mixture is introduced into ice and water and no more amino-imino-isoindolenine nitrate is precipitated by further dilution and the product is obtained in excellent yield and purity by sucking off, washing until neutral and drying.

*Example 64*

1 part of the intermediate product containing copper prepared according to Examples 60 or 61 is introduced with stirring at 0–10° C. into 10 parts of 20% fuming sulphuric acid and agitated at that temperature until the reaction mixture has become colorless. Then the solution is brought into a mixture consisting of ice, 2–3 parts of potassium nitrate and about 16 parts of sodium bicarbonate.

At the end of this working stage the reaction is to be neutral or weakly acid. The amino-imino-isoindolenine nitrate precipitating in a crystalline form is very purely obtained by sucking off and washing with a large amount of water. It can further be purified by boiling off with methanol.

Instead of the mixture of potassium nitrate and sodium bicarbonate also other compositions may be used, such as ammonium nitrate, ammonia, or the sodium salt of naphthalene-1-sulfonic acid and ammonia. In the latter case the amino-imino-isoindolenine precipitates as the salt of naphthalene-1-sulfonic acid which is difficultly soluble in water.

*Example 65*

60 parts of copper acetate are dissolved in 254 parts of formamide with stirring at 100–120° C. and 25.4 parts of 3.3′.4.4′-tetracyanodiphenyl are introduced into the solution. After half an hour's stirring at 160° C. orange colored needles precipitate which after cooling are sucked off, washed with some formamide and alcohol and dried. The yield amounts to 51 parts.

51 parts of the complex copper compound thus obtained are introduced at 0° C. with cooling and stirring into 500 parts of nitric acid of the specific gravity 1.5. After half an hour's stirring the orange colored crystals have gone into solution and copper nitrate has deposited. After stirring into ice colorless needles of the nitrate of 6.6′-di-(amino-imino-isoindoleninyl) precipitate which after sucking off are washed neutral with water and dried.

On decomposing the copper complex compounds with a solution of 51 parts of potassium cyanide in 250 parts by volume of water at 0–10° C.

Instead of using nitric acid, 6.6'-di-(amino-3-imino-isoindoleninyl) is obtained as free base.

Example 66

100 parts of the red copper complex compound obtained from phthalonitrile and excess copper acetate in formamide as described in Example 60 are stirred into a solution of 100 parts of potassium cyanide in 500 parts by volume of water and stirring is continued until the red crystals have been converted into a paste of colorless prismatic needles of amino-imino-isoindolenine which after sucking off with saturated common salt solution are washed and dried in air. The yield amounts to 52 parts.

Example 67

11 parts of phthalonitrile and 13 parts of cuprous chloride are heated in 100 parts of quinoline at 120–140° C. for ten hours while passing over dry ammonia gas. Thereupon the mixture is cooled down to room temperature under gaseous ammonia, washed with alcohol and dried. 22 parts of a technically pure complex compound of the probable composition $$(C_8H_7N_3Cu)_2CuCl$$

are thus obtained. By aftertreating with aqueous ammonium chloride-ammonia solution, methanol and acetone the brick-red complex salt may be obtained in analytically pure form.

By treatment with nitric acid while using the same proportions of ingredients and following the procedure as described in Examples 60 and 61 the nitrate of amino-imino-isoindolenine is obtained in good yield.

Example 68

5 parts of a copper complex compound obtained as described in Example 61 are suspended in 50–70 parts of ice water; 3.7 parts of concentrated sulfuric acid are added and the suspension is reacted with $H_2O_2$ at temperatures at around 0° C. The complex containing copper is decomposed within 10–15 minutes, copper sulfate is dissolved and the neutral sulfate of amino-imino-isoindolenine being slightly soluble in cold water is precipitated. The product may be easily isolated by sucking off and washing with cold water.

Example 69

128 parts of phthalonitrile are stirred with 150 parts of cuprous chloride and 1000 parts of ethanol in a closed vessel and ammonia gas is introduced until the phthalonitrile has disappeared from the reaction mixture. The reaction is accomplished at room temperature at normal pressure.

A brick-red, microcrystalline copper compound containing amino-imino-isoindolenine is formed from which—as indicated in Example 60—the nitrate of amino-imino-isoindolenine may be obtained by means of concentrated nitric acid. In case atmospheric oxygen has not been excluded during reaction the brick-red crystal powder contains some blue grey crystals.

The product treated with boiling formamide exhibits the following composition:

C=35.45%
H=2.65%
O=0.96%
N=15.17%
Cu=37.2%
Cl=6.9%

Example 70

128 parts of phthalonitrile are heated with 150 parts of cuprous chloride in 1000 parts of liquid ammonia in the autoclave with stirring and the temperature is kept at 150° C. for 10 minutes. After cooling and blowing off the ammonia a red brown copper complex containing amino-imino-isoindolenine remains behind. The reaction product does not contain any phthalonitrile. Amino-imino-isoindolenine may be obtained as nitrate from the reaction product by means of concentrated nitric acid as indicated in Example 60.

Example 71

22 parts of 1-anilino-3-imino-isoindolenine (melting point 207° C.) are introduced into 69 parts of boiling tetraline. The solution is rapidly orange colored with the evolution of ammonia. Boiling is stopped after 3–4 minutes, the solution is cooled to about 100° C. and sucked off. The residue consists of a small quantity (about 0.8 part) of finely crystallized, metal-free phthalocyanine.

On diluting the brown orange colored filtrate with one and a half times the quantity of methanol weakly orange colored needles precipitate. After cooling the precipitate is sucked off, washed with methanol and dried. The yield amounts to 6.5 parts. On boiling for a longer time the yield of the orange red product is reduced. The product is readily soluble in hot benzene and crystallizes by adding methanol in felted, brownish red needles melting at 187° C. According to analysis (C=79.15, H=4.6, N=15.75%) the reaction product is a condensation product consisting of 2 mols of 1-anilino-3-imino-isoindolenine having split off one mol of $NH_3$ or of 3 mols of amino-phenyl-imino-phthalimide having split off 2 mols of $NH_3$.

The orange red colored product melting at 187° C. is slightly soluble in methanol, however, immediately dissolves with deep orange yellow coloration by adding sodium hydroxide solution. By adding some water and hydrosulfite to the mixture an initially green, thereafter blue, vat-like solution is obtained which is decolorized on heating.

Example 72

24 parts of 1-oxethyl-amino-3-oxethyl-imino-isoindolenine (prepared according to Example 59) are stirred with 100 parts of acetic anhydride, the temperature being allowed to raise to 50° C. After one hour the excess anhydride is decomposed by adding ice; common salt solution is added to the clear solution in equal volume and the precipitated 1-acetoxethyl-amino-3-acetoxethyl-imino-isoindolenine-hydrochloride is isolated by conventional methods. The reaction product is obtained as colorless, readily soluble salt.

Example 73

13 parts of amino-imino-isoindolenine and 30 parts of anesthesin are dissolved in 200 parts of anhydrous ethanol and the temperature is raised to 130° C. while distilling the alcohol. The reaction is completed within a short time. After stirring with cold alcohol, sucking off and drying 19 parts of analytically pure, light-yellow 1-(p-carbethoxy-phenyl)-amino-3-imino-isoindolenine melting at 198–200° C. are obtained.

Example 74

The following substance are successively reacted in 100 parts of anhydrous ethanol at the said temperatures:

0.5 part of sodium at 20–50° C.,
26 parts of phthalonitrile at 40–50° C.,
40 parts of sulfanilic acid amide at 80° C.

The mixture is gradually cooled with stirring and the crystallized 1(p-sulfonylamido-phenyl)amino-3-imino-isoindolenine is isolated in known manner. 50–51 parts of a light-yellow product melting at 212° C. are obtained.

Example 75

80 parts of phthalonitrile and 97 parts of 3-chloro aniline are reacted in a methylate solution consisting of 2 parts of sodium and 50 parts of methanol at temperatures between 30 and 45° C. Already after 30 minutes the reaction product begins to crystallize from the clear solution. After 10–20 hours isolation is accomplished in the usual manner. 115–120 parts of pure, light-yellow 1-(3'-chlorophenyl)-amino-3-imino-isoindolenine melting at 214° C. are obtained.

Example 76

2 parts of sodium are dissolved in 150 parts of anhydrous methanol and in this solution 80 parts of phthalonitrile and 100 parts of 4-chloro aniline are caused to react. 105–110 parts of light-yellow 1-(4'-chlorophenyl)-amino-3-imino-isoindolenine melting at 206° C. are obtained.

Example 77

78 parts of 1-(3'-chlorophenyl)-amino-3-imino-isoindolenine (prepared according to Example 75) and 38 parts of 3-chloro aniline are heated in 100 parts of xylene at 150° C. for 7 hours, filtered at 100° C. and stirred when cold; the yellow crystallizate is sucked off when ice-cold, washed with benzine and dried. 91 parts of 1-(3'-chlorophenyl)amino-3-(3''-chlorophenyl)-imino-isoindolenine melting at 150° C. are obtained.

Example 78

78 parts of 1-(4'-chlorophenyl)-amino-3-imino-isoindolenine (prepared according to Example 77), 39 parts of 4-chloro aniline and 100 parts of xylene are heated under reflux to the boil for 5–7 hours, all reactants being dissolved thereby. 96 parts of 1-(4'-chlorophenyl)-amino-3-(4''-chlorophenyl)-imino-isoindolenine melting at 150° C. are obtained.

Example 79

2 parts of sodium, 80 parts of 4-anisidine, 80 parts of phthalonitrile are successively dissolved in 100 parts of anhydrous methanol, the temperature being allowed to raise up to 40–50° C. After 24 hours the crystallized product is sucked off when ice-cold, washed and dried. 128 parts of 1-(4'-methoxy-phenyl)-amino-3-imino-isoindolenine melting at 190–195° C. are obtained.

Example 80

81 parts of 1-(4'-methoxyphenyl)-amino-3-imino-isoindolenine (prepared according to Example 80), 41 parts of 4-anisidine in 100 parts of xylene are heated to the boil for 6–8 hours and then cooled with stirring. 85–90 parts of 1-(4'-methoxyphenyl)-amino-3-(4''-methoxyphenyl)-imino-isoindolenine are obtained. The yellow product melts at 150–155° C.

Example 81

14.5 parts of amino-imino-isoindolenine are dissolved at 20° C. with stirring in 70 parts of an aqueous acetadelhyde solution (30%). The crystal paste precipitating thereby is sucked off and washed with acetone. 22.5 parts of a crude product are obtained which are dissolved in some methanol. After filtering the solution is stirred into ether, the prismatic needles precipitating thereby are washed with ether after sucking off. According to analysis the Schiff base thus formed contains 3 mols of crystal water.

Example 82

40 parts of amino-imino-isoindolenine are dissolved in 100 parts of a formaldehyde solution (30%). After completion of the reaction acetone is added with stirring until the solution begins to become turbid. The crystallizing prismatic needles are sucked off and washed with acetone and ether. 51 parts of the reaction product ($C_9H_7N_3 \cdot 2H_2O$ or $C_9H_9ON_3 \cdot H_2O$) are obtained.

Example 83

15 parts of amino-imino-isoindolenine are dissolved in 53 parts of benzaldehyde and stirred at 30° C. for 24 hours. The crystalline precipitate is sucked off, washed with acetone and dried. 25 parts of benzalamino-imino-isoindolenine containing according to analysis 3 mols of crystal water are obtained.

Example 84

29 parts of amino-imino-isoindolenine are dissolved at 50° C. in 500 parts of water. Thereto is added at 40–50° C. with stirring a solution of 10.6 parts of sodium carbonate in 100 parts of water and a stream of phosgene is introduced for 2 hours. Thereupon the solution is cooled to 0° C., the crystallized precipitate is sucked off and washed with some water, then with acetone and subsequently with ether. Prisms being soluble in warm water and methanol and yielding no difficultly soluble salt with ammonium nitrate are obtained.

According to analyses the reaction product is not uniform but consists for the most part of di-(3-imino-isoindoleninyl-1)-urea containing 2 mols of crystal water.

Example 85

14.5 parts of amino-imino-isoindolenine are dissolved in 300 parts of water. To this solution are added with stirring 8.5 parts of potassium cyanate, 10 parts of hydrochloric acid (37%) and 20 parts of water. A colorless precipitate temporarily forms which is redissolved on gently heating. After adding 60 parts of common salt prismatic plates precipitate from this solution which after sucking off are dried in air. 18 parts of 1-carbaminyl-amino-3-imino-isoindolenine or 3-imino-isoindoleninyl-1-urea respectively or its tautomeric form are obtained.

We claim:

1. A process for the preparation of 1-amino-3-imino-isoindolenines, which comprises heating an o-phenylene compound selected from the group consisting of o-phenylene dicarboxylic acids, their anhydrides, amides and imides, with a compound selected from the group consisting of urea and biuret, a compound selected from the group consisting of ammonium molybdate and ammonium phosphate, and an at least equimolar amount of a compound selected from the group consisting of ammonium nitrate and ammonium chloride, calculated on said o-phenylene compound, at temperatures from about 140° C. to about 200° C.

2. A process as claimed in claim 1, wherein the reaction is carried out in the presence of an inert organic solvent.

3. The nitrate of 1-amino-3-imino-isoindolenine.

4. An addition compound of a 1-amino-3-imino-isoindolenine of the general formula:

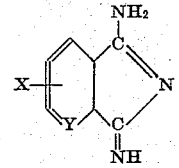

wherein X is a member of the group consisting of hydrogen and chlorine, and Y is a member of the group consisting of CH and N, with an equimolecular quantity of a member of the group consisting of water, alcohols, nitric acid, phosphoric acid, sulfuric acid, hydrochloric acid, formic acid, acetic acid, oxalic acid, aliphatic sulfonic acids, and aromatic sulfonic acids.

References Cited in the file of this patent

UNITED STATES PATENTS

| | | |
|---|---|---|
| 2,182,763 | Muehlbauer | Dec. 5, 1939 |
| 2,276,598 | Stocker et al. | Mar. 17, 1942 |
| 2,318,783 | King et al. | May 11, 1943 |
| 2,410,301 | O'Neal | Oct. 29, 1946 |
| 2,469,663 | Moser | May 10, 1949 |
| 2,471,794 | Sumner | May 31, 1949 |

OTHER REFERENCES

Haddock: Jour. Soc. Dyers and Colourists, March 1945, pp. 68–73.